US008009157B2

(12) United States Patent
Shimizu et al.

(10) Patent No.: US 8,009,157 B2
(45) Date of Patent: Aug. 30, 2011

(54) DRIVE CIRCUIT AND DRIVE METHOD OF LIGHT EMITTING DISPLAY APPARATUS

(75) Inventors: Hisae Shimizu, Tokyo (JP); Katsumi Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 747 days.

(21) Appl. No.: 12/028,588

(22) Filed: Feb. 8, 2008

(65) Prior Publication Data

US 2008/0225023 A1 Sep. 18, 2008

(30) Foreign Application Priority Data

Mar. 12, 2007 (JP) ................................ 2007-061871

(51) Int. Cl.
*G06F 3/038* (2006.01)

(52) U.S. Cl. ....................................................... 345/205

(58) Field of Classification Search .................... 345/82, 345/204

See application file for complete search history.

(56) References Cited

U.S. PATENT DOCUMENTS

| | | | | |
|---|---|---|---|---|
| 4,856,090 | A | 8/1989 | Kitani et al. | |
| 5,504,847 | A | 4/1996 | Kimura et al. | |
| 5,952,789 | A | 9/1999 | Stewart et al. | |
| 6,509,690 | B2 | 1/2003 | Sempel et al. | |
| 6,809,706 | B2 | 10/2004 | Shimoda | |
| 2002/0075229 | A1* | 6/2002 | Ito et al. | 345/156 |
| 2006/0232522 | A1* | 10/2006 | Roy et al. | 345/76 |
| 2007/0040769 | A1* | 2/2007 | Tai et al. | 345/76 |
| 2007/0080908 | A1* | 4/2007 | Nathan et al. | 345/77 |

FOREIGN PATENT DOCUMENTS

| | | |
|---|---|---|
| EP | 1713053 | 10/2006 |
| WO | 2005/029456 | 3/2005 |

OTHER PUBLICATIONS

Chinese Office Action from corresponding Chinese Application No. 200810083579.7, dated Jan. 29, 2010, and English language translation thereof.

Extended European Search Report dated Nov. 18, 2009, from corresponding European Application No. 08002641.2-2205.

European Office Action dated May 10, 2011, from corresponding European Patent Application No. 08002641.2.

* cited by examiner

*Primary Examiner* — Richard Hjerpe
*Assistant Examiner* — Carolyn R Edwards
(74) *Attorney, Agent, or Firm* — Fitzpatrick, Cella, Harper & Scinto

(57) ABSTRACT

A drive circuit for a light emitting display apparatus including a pixel circuit having a light emitting device for emitting a light having brightness determined based on supplied current and a drive transistor for supplying the current to the light emitting device, comprises a threshold value correction circuit converting a second signal including a threshold voltage of the drive transistor and a data voltage, the second signal being output from the drive transistor when a first signal including the data voltage is input into the control electrode of the drive transistor, into a third signal including the threshold voltage of an inverted polarity and the data voltage or a voltage corresponding to the data voltage, to output the converted third signal to the pixel circuit. The pixel circuit includes a switch for supplying the third signal to the control electrode of the drive transistor.

4 Claims, 10 Drawing Sheets

DRIVE CIRCUIT AND DRIVE METHOD OF LIGHT EMITTING DISPLAY APPARATUS

BACKGROUND OF THE INVENTION

1. Field of the Invention

The present invention relates to a drive circuit and a drive method of a light emitting display apparatus using light emitting display devices, especially using organic electro-luminescence (hereinafter briefly referred to as EL) devices.

2. Related Background Art

In recent years, the development of displays using self light emitting devices, such as an inorganic EL device, an organic EL device, and a light emitting diode, has actively performed as the next generation large-screen thin-shaped display apparatus followed by a liquid crystal display apparatus and a plasma display apparatus.

In particular, because the organic EL device can be formed by depositing layers on a glass substrate and a flexible substrate such as a film, the full-scale practical realization of the organic EL device has been expected from the recent improvement of the luminous efficiency and the reliability thereof.

The drive of the organic EL device is principally performed by an active matrix drive system, which has been proven in liquid crystal displays and is realized by thin film transistors (hereinafter referred to as TFTs) using poly-silicon, an amorphous semiconductor, or the like.

Among them, the amorphous semiconductor can be formed on a film substrate by a low temperature process, and thereby has a technological advantage in the use of large-size and thin-shaped displays.

The active-matrix (hereinafter referred to as AM) type organic EL display apparatus adjusts the brightness thereof and performs gradation display by controlling the voltages and the currents that are supplied to the organic EL devices according to voltage signals or current signals that are supplied on drive transistors (see FIG. 15). The U.S. Pat. No. 6,809,706 discloses an example of a pixel circuit of the AM type organic EL display apparatus including the drive transistors.

However, there is the following actual problem in controlling the brightness of the organic EL devices by means of the drive transistors.

That is, the electric characteristics of the drive transistors are sometimes dispersed in respective pixels owing to the variation of manufacturing processes. Moreover, the electric characteristics of the drive transistors sometimes change dependently on environments and electrification times. When the electric characteristics change, the changes of threshold values are especially remarkable.

Even if the same data signal is applied, the currents flowing through the drive transistors are consequently different from one another. The changes of the currents cause production of the differences of brightness of the light emitting devices at each pixel and each time, and therefore bring about display unevenness extending over the whole display screen.

On the other hand, it has been proposed to cancel the dispersion of the electric characteristics of the drive transistors by operating the voltages supplied to light emitting devices to have the same electric potential as the data signals by negative-feedback loops using differential amplifiers (see, for example, U.S. Pat. No. 6,809,706). In this case, the control of the brightness of the light emitting devices is performed based on voltages.

However, if the brightness of organic EL devices is controlled based on voltages, the gradation control of the devices is more complicated because the brightness-voltage characteristics of the devices do not have linearity.

Moreover, because the brightness-voltage characteristics change with time, the method of such a control is also needed to be changed according to the aged deterioration of the characteristics.

From the above reasons, it is desirable to control the brightness not using voltages but using currents.

Accordingly, it is an object of the present invention to provide a drive circuit realizing good image quality even if the threshold values of drive transistors show variation, or aged deterioration when stable currents are supplied to light emitting devices in a light emitting display apparatus. That is, according to a scope of the present invention, a drive circuit and a drive method of a light emitting display apparatus are both capable of realizing good image quality by correcting the threshold values of drive transistors when the light emitting operations of light emitting devices are performed at desired brightness gradation.

SUMMARY OF THE INVENTION

The inventors have made the present invention with great efforts to solve the above-described problem.

A drive circuit of the present invention for a light emitting display apparatus including a pixel circuit having a light emitting device for emitting a light having brightness determined based on a supplied current and a drive transistor for supplying the current to the light emitting device, comprises: a threshold value correction circuit for converting a second signal including a threshold voltage of the drive transistor and a data voltage, the second signal being output from the drive transistor when a first signal including the data voltage is input into a control electrode of the drive transistor, into a third signal including the threshold voltage of an inverted polarity and the data voltage or a voltage corresponding to the data voltage, and outputting the third signal to the pixel circuit, wherein the pixel circuit includes a switch for supplying the third signal to the control electrode of the drive transistor.

Moreover, a drive circuit of the present invention for a light emitting display apparatus including a pixel circuit having a light emitting device for emitting a light having brightness determined based on a supplied current, a drive transistor to supply the current to the light emitting device, a first to a fifth switches, and a capacitor, and a threshold value correction circuit for correcting a threshold value of the drive transistor of the pixel circuit, wherein the threshold value correction circuit includes a first and a second operational amplifiers, and a first and a second resistor devices so that the first operational amplifier has an output terminal connected to an inversion input (also called negative input) terminal of the second operational amplifier through the first resistor device, a non-inversion input (also called positive input) terminal connected to a source terminal of the drive transistor through the first switch, and an inversion input terminal connected to the output terminal of the first operational amplifier, wherein the second operational amplifier has an output terminal connected to an inversion input terminal thereof through the second resistor device, wherein the capacitor is connected to the output terminal of the second operational amplifier through the second switch, wherein the third switch is connected between the source terminal of the drive transistor and the ground, and wherein one of terminals of each of the fourth switch and the fifth switch is connected to a gate terminal of the drive transistor, the other terminal of the fourth switch is connected to a connection point between the capacitor and the second switch, and the other terminal of the fifth switch is connected to a signal line from a data driver.

Moreover, a drive circuit of the present invention for a light emitting display apparatus including a pixel circuit having a light emitting device for emitting a light having brightness determined based on a supplied current, a drive transistor for supplying the current to the light emitting device, a first to a fourth switches, and a capacitor, and a threshold value correction circuit for correcting a threshold value of the drive transistor of the pixel circuit, wherein the threshold value correction circuit includes a first and a second operational amplifiers, and a first and a second resistor devices, wherein the first operational amplifier has an output terminal connected to an inversion input terminal of the second operational amplifier through the first resistor device, a non-inversion input terminal connected to a source terminal of the drive transistor through the first switch, and an inversion input terminal connected to the output terminal of the first operational amplifier, wherein the second operational amplifier has an output terminal connected to the capacitor through the second switch, wherein the third switch is connected between the source terminal of the drive transistor and the ground, and wherein a connection point between the capacitor and the second switch is connected to a gate terminal of the drive transistor and is connected to a signal line from a data driver through the fourth switch.

A drive method of the present invention for a light emitting display apparatus including a pixel circuit having a light emitting device for emitting a light having brightness determined based on a supplied current and a drive transistor for supplying the current to the light emitting device, comprises: a first period in which a first signal including a data voltage is input into a control electrode of the drive transistor and a second signal, output from the drive transistor and including a threshold voltage of the drive transistor and the data voltage, is converted into a third signal including the threshold voltage of an inverted polarity and the data voltage or a voltage corresponding to the data voltage, to be stored in a capacitor; and a second period in which the third signal stored in the capacitor is supplied to the control electrode of the drive transistor to make the light emitting device emit a light.

A camera of the present invention is the one using any one of the above-mentioned drive circuits of the present invention for the light emitting display apparatus.

According to the present invention, it can be attained to stably provide a high quality light emitting display apparatus that does not cause a problem of display unevenness of image quality and the like even if variation of threshold values of drive transistors is caused owing to the factors of manufacturing processes, environmental conditions, and electrification times.

Further features of the present invention will become apparent from the following description of exemplary embodiments with reference to the attached drawings.

DETAILED DESCRIPTION OF THE INVENTION

Next, the exemplary embodiments of the present invention will be described with reference to the attached drawings.

The drive transistors that can be used for the present invention are those having variation of threshold values among the parameters pertaining to electric optical characteristics, or having shift of threshold values as changes of electric optical characteristics owing to electric stresses.

The present invention corrects the variation of the threshold voltages of the transistors for driving to obtain the stable emission intensity of light emitting devices with the suppressed influences of the threshold voltages of the transistors for driving. As the light emitting devices, the light emitting devices emitting lights having the brightness determined by supplied currents, for example, AM type organic EL devices can be used.

Figure 1:
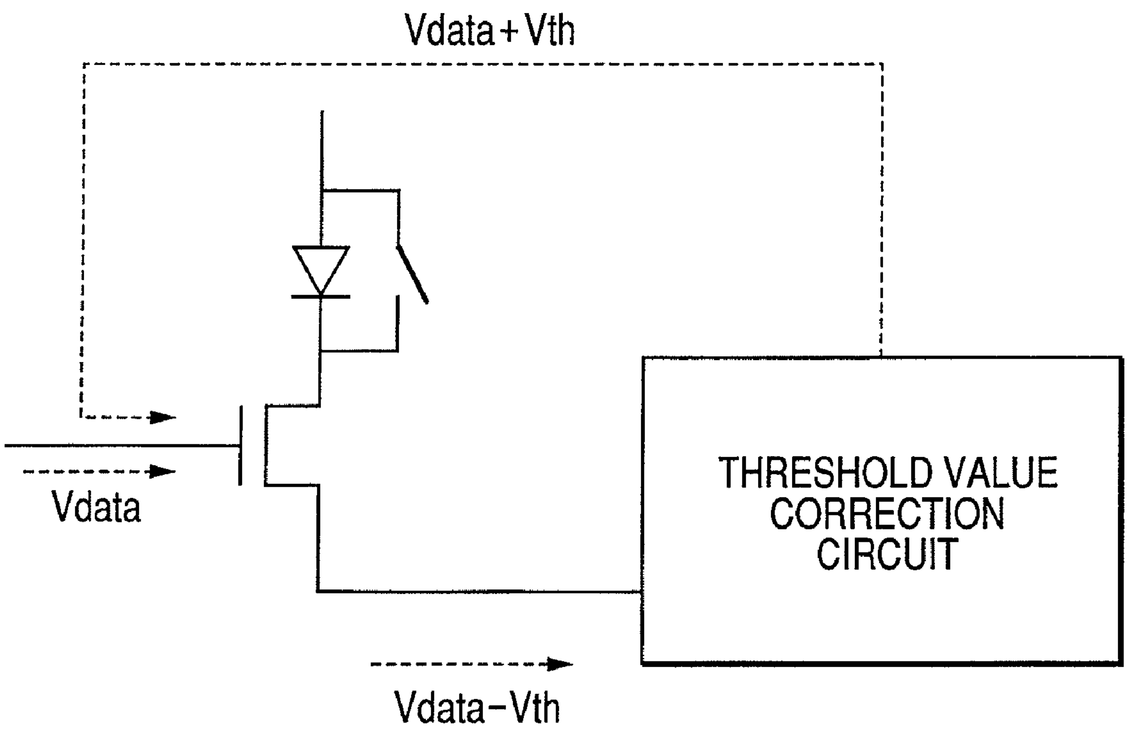
FIG. 1 is a diagram illustrating the configuration and the operation of an exemplary embodiment of a drive circuit of the present invention.

In the following, the configuration and the operation of an exemplary embodiment of a drive circuit of the present invention will be described with reference to the drawings. As illustrated in FIG. 1, the drain terminal of a drive transistor is connected to a light emitting device, and the source terminal of the drive transistor is connected to a threshold value correction circuit for correcting the threshold value of the drive transistor. Either of a data voltage Vdata and an output from the threshold value correction circuit is input into the gate of the drive transistor, which gate is the control electrode thereof. The data voltage Vdata is input into the gate of the drive transistor by turning on a switch in a period before a light emitting device driving period of the light emitting device. A voltage of (Vdata−Vth) (Vth denotes a threshold voltage) is input into the threshold value correction circuit, and the threshold value correction circuit inverts the polarity (positive or negative) of the threshold voltage Vth to output a voltage (Vdata+Vth) to the gate of the drive transistor.

If the gate-to-source voltage is denoted by Vgs here, then the drain current Ids of the drive transistor is expressed by $Ids \propto (Vgs-Vth)^2$. Because there is a relation Vgs=Vdata+Vth, the drain current Ids can be expressed as $Ids \propto (Vdata)^2$.

Additional explanation of inversion of the polarity (positive and negative) of the above-described threshold voltage Vth will be given. The expression "inverting the polarity of the Vth" is used in the specification of the present application to mean that the polarity of the Vth included in the above-described equation Vdata−Vth is inverted. That is, let the Vth the polarity of which is inverted be Vth', then this readily provides Vth'=−Vth. Therefore, a signal resulted in after the polarity inversion is expressed by Vdata−(Vth')=Vdata−(−Vth)=Vdata+Vth.

Consequently, the current to be supplied to the light emitting device by the drive transistor during the light emitting device driving period (light emitting period) has a value independent of the threshold value Vth of the drive transistor, and the current scarcely receives the influences of the value of the threshold voltage Vth and the changes of the value.

Incidentally, only the thing required for the threshold value correction circuit is to have the function of inverting the polarity (positive or negative) of the threshold voltage Vth, and the threshold value correction circuit is not necessarily required to output the voltage (Vdata+Vth). The threshold value correction circuit may output, for example, a voltage (2V1−Vdata+Vth) as it will be described in a second exemplary embodiment described below. V1 denotes an arbitrary DC voltage, and (2V1−Vdata) indicates a signal corresponding to the data voltage Vdata here. If V1=Vdata, then the output of the threshold value correction circuit is the voltage (Vdata+Vth).

Figure 2:
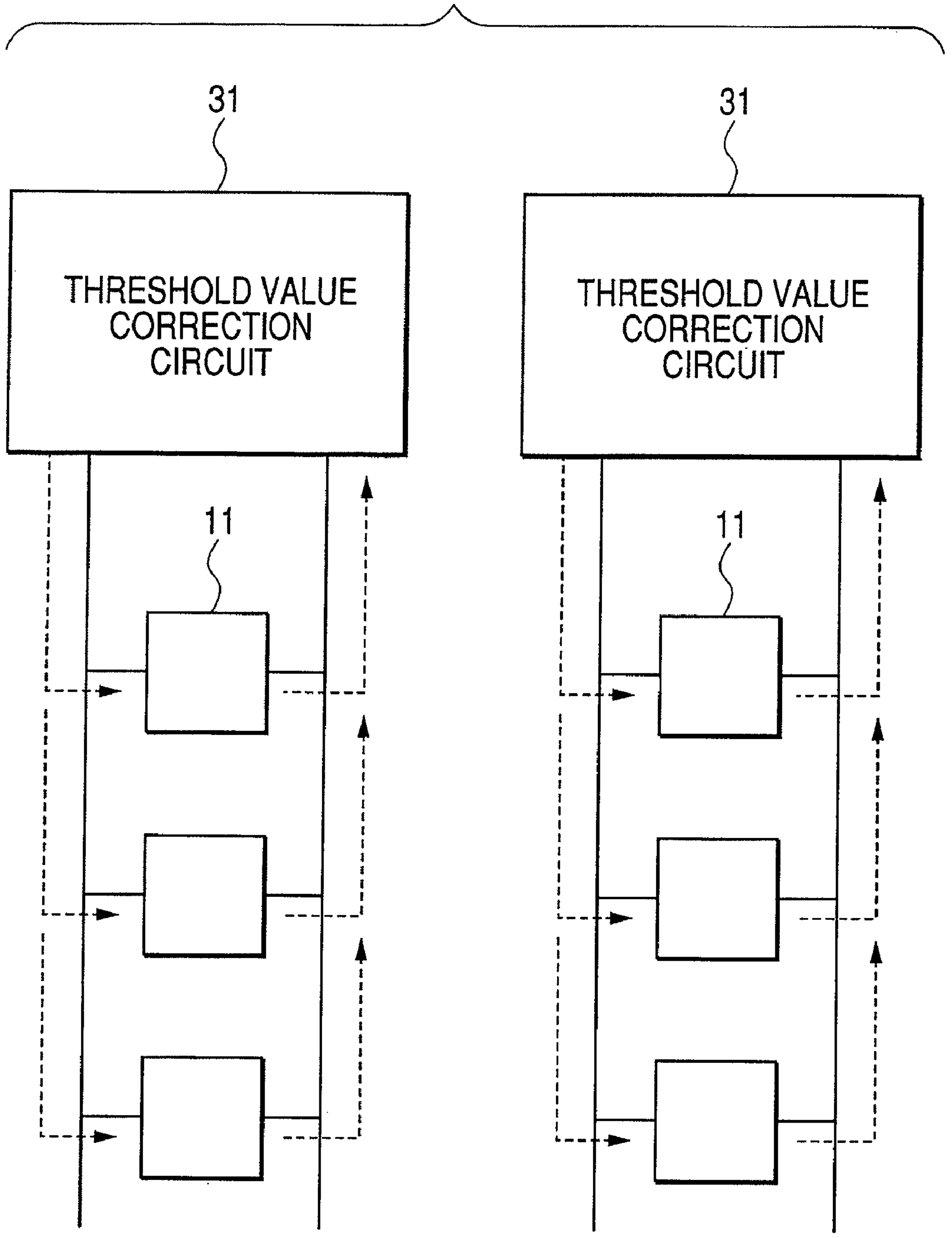
FIG. 2 is a diagram illustrating a configuration of providing a threshold value correction circuit to each pixel circuit column.

In the present exemplary embodiment, the threshold value correction circuit is provided to each pixel circuit including a drive transistor, and the threshold value correction circuit and the pixel circuit may constitute a pixel. However, as illustrated in FIG. 2, a threshold value correction circuit 31 may be provided to each pixel circuit column, in which a plurality of pixel circuits 11 are arranged. In an exemplary embodiment described below, the configuration illustrated in FIG. 2 will be described. The configuration of the pixel circuit will be described in the exemplary embodiment described below, but the configuration of the pixel circuit is not limited to that of the exemplary embodiment.

Incidentally, in the present specification, a field-effect transistor for driving is described as the drive transistor.

First Exemplary Embodiment

Figure 3:
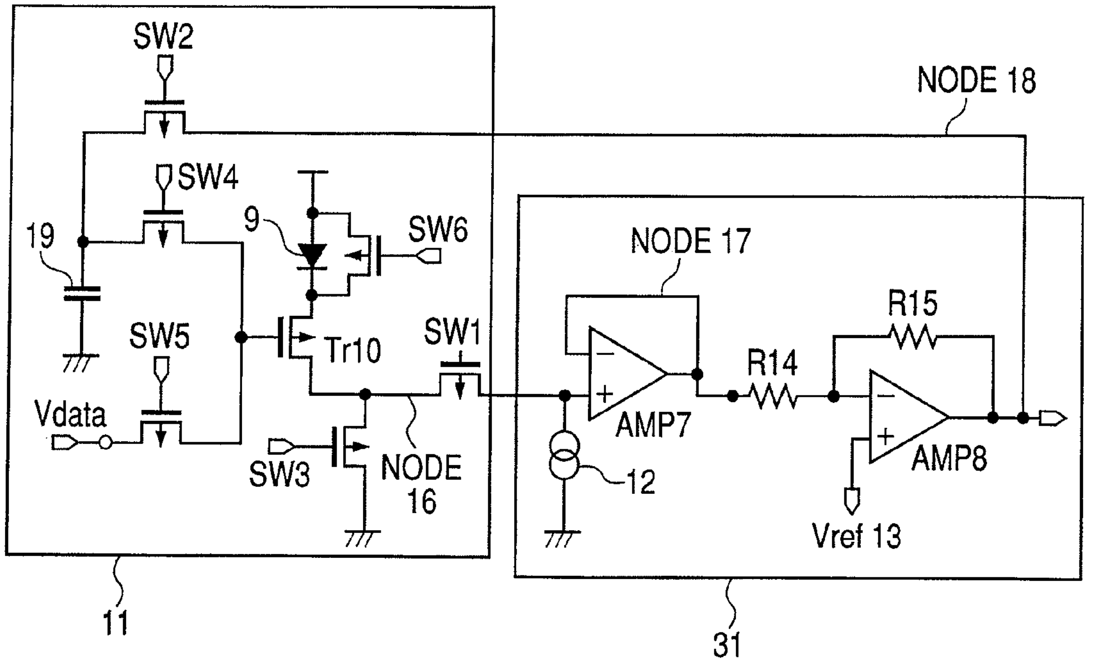
FIG. 3 is a diagram illustrating the configurations of a pixel circuit and a threshold value correction circuit of an AM type organic EL display apparatus, which is a first exemplary embodiment of the drive circuit of the present invention.
Figure 4:
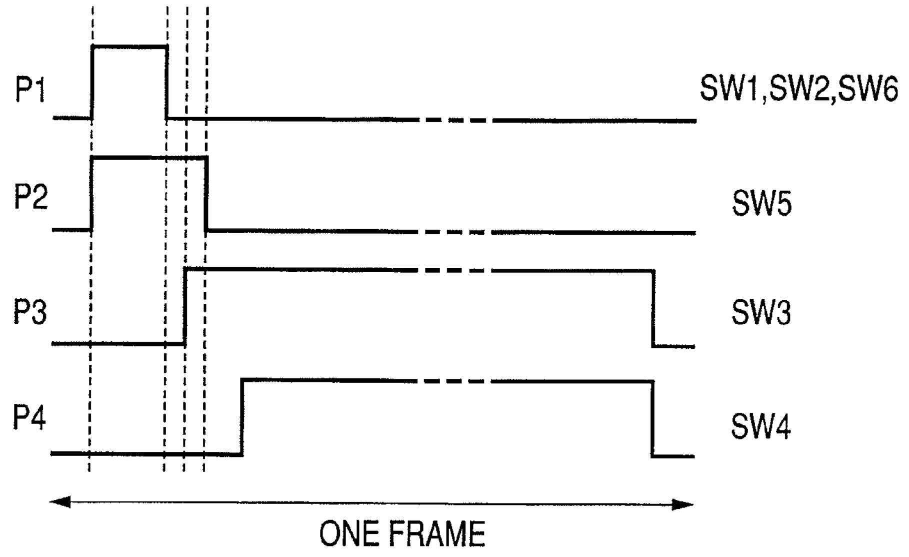
FIG. 4 is a timing chart illustrating the operation of the pixel circuit of the first exemplary embodiment.
Figure 5:
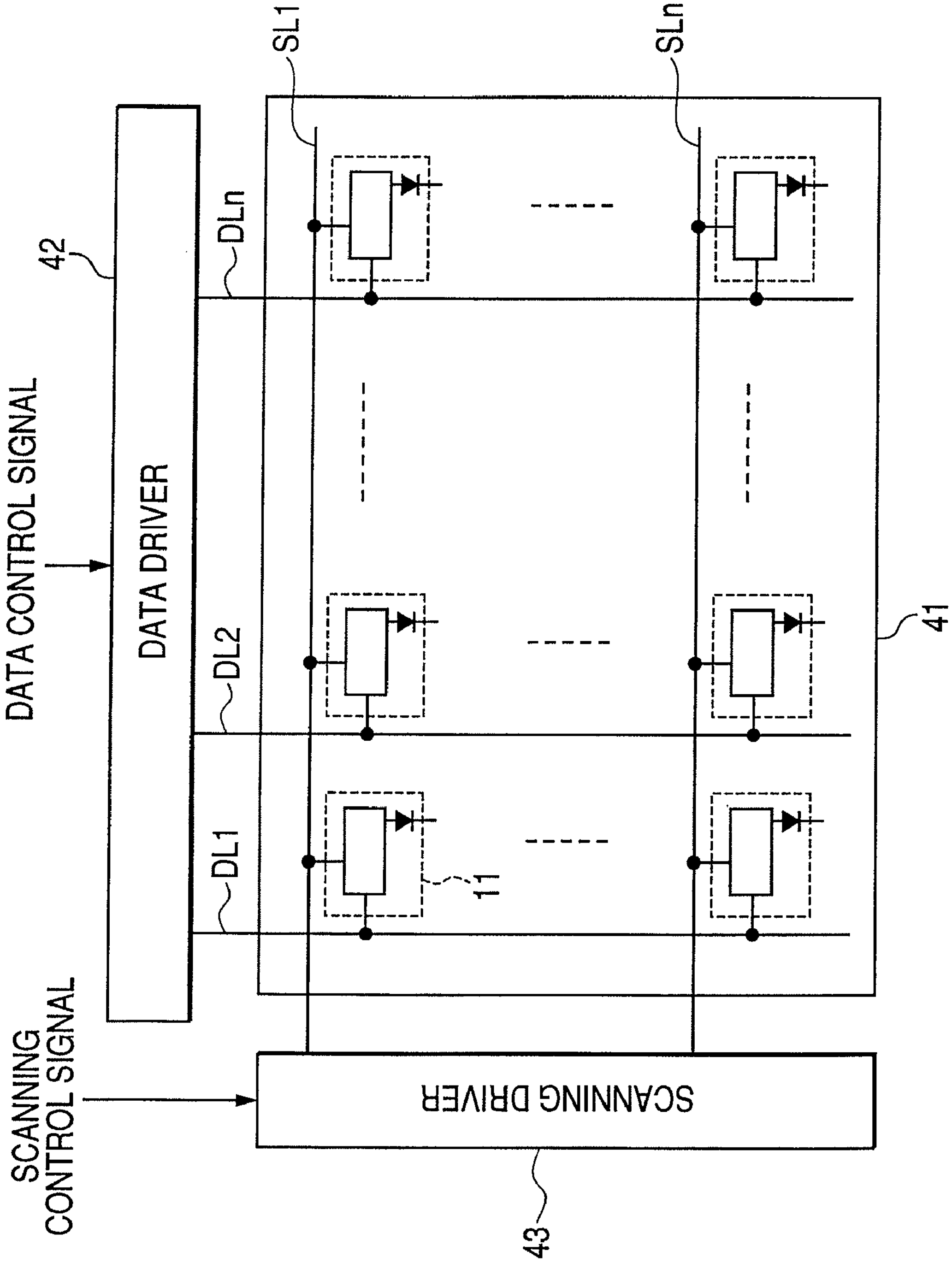
FIG. 5 is a diagram illustrating the schematic configuration of the whole body of the AM type organic EL display apparatus of the first exemplary embodiment.
Figure 6:
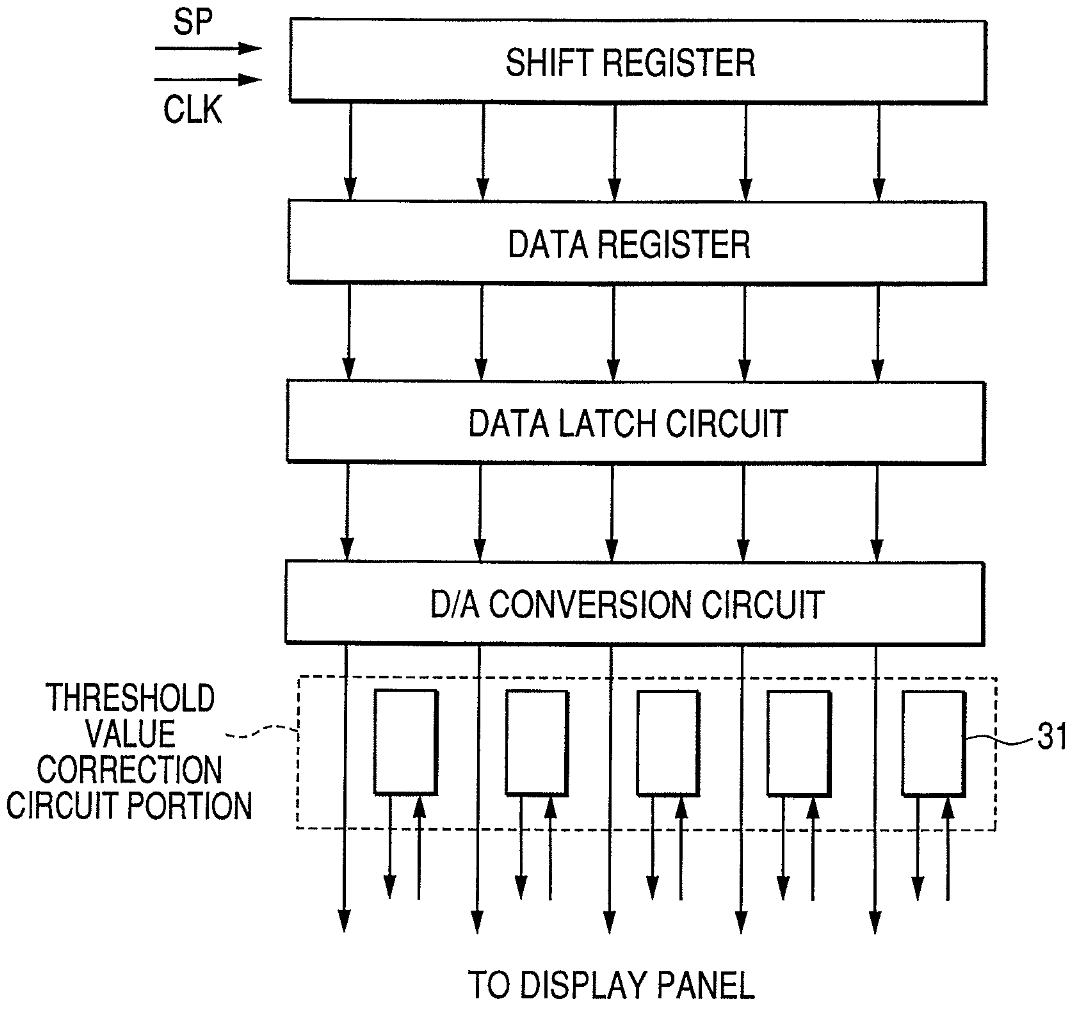
FIG. 6 is a diagram illustrating a data driver and a threshold value correction circuit portion.
Figure 7:
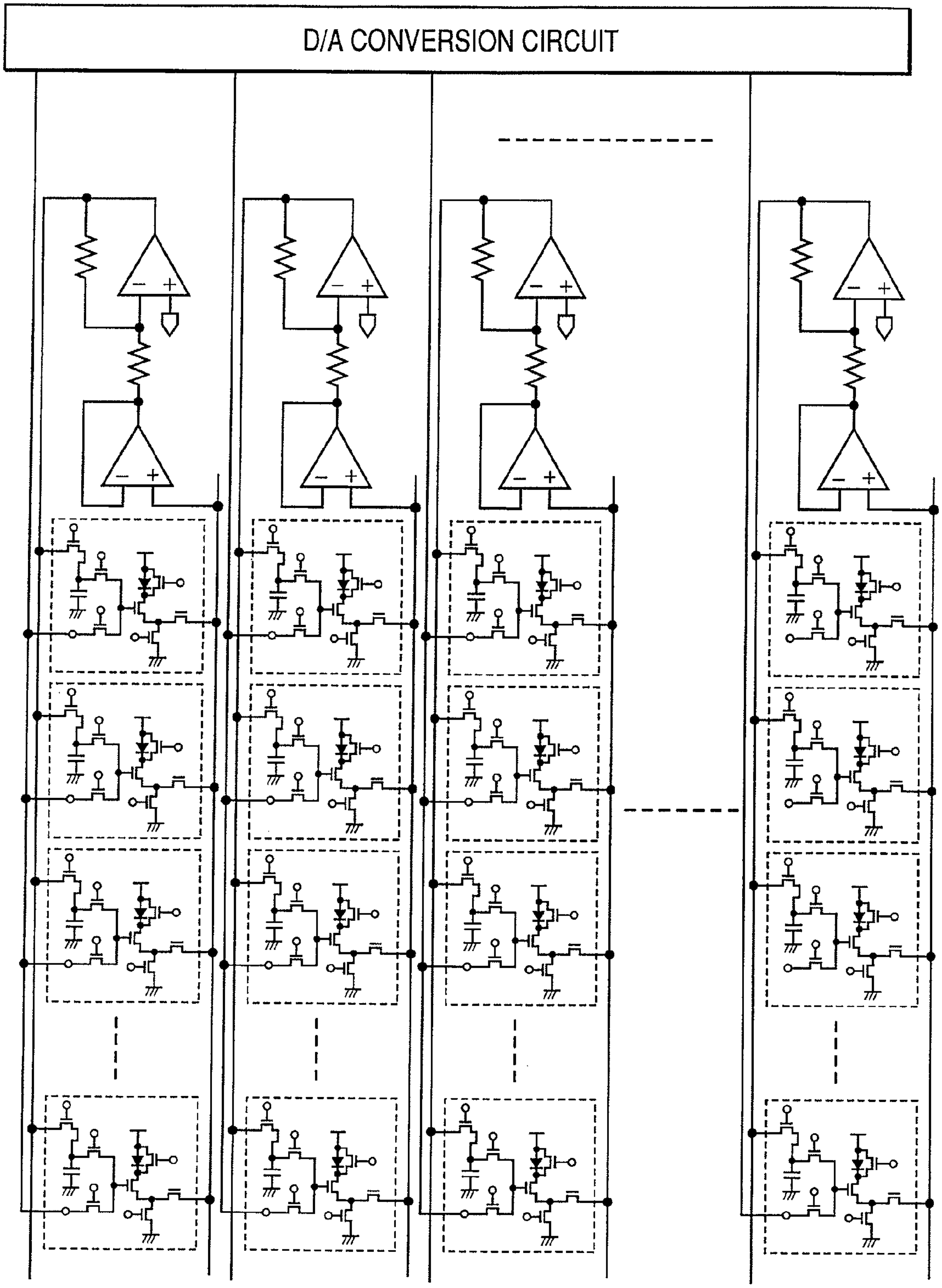
FIG. 7 is a diagram illustrating a D/A converter, the threshold value correction circuit portion, and pixel circuit columns.

FIG. 3 is a diagram illustrating a pixel circuit and a threshold value correction circuit of an AM type organic EL display apparatus, which are a first exemplary embodiment of the drive circuit of the present invention, and FIG. 4 is a timing chart illustrating the operation of the pixel circuit. FIG. 5 is a diagram illustrating the schematic configuration of the whole body of the AM type organic EL display apparatus. FIG. 6 is a diagram illustrating a data driver and a threshold value correction circuit portion. FIG. 7 is a diagram illustrating a D/A converter, the threshold value correction circuit portion, and pixel circuit columns. Incidentally, FIG. 5 does not illustrate the threshold value correction circuit for simplification. In the present exemplary embodiment, an AM type organic EL device is used as the light emitting device emitting a light having the brightness determined by a supplied current.

As illustrated in FIG. 5, the AM type organic EL display apparatus includes a pixel region 41 having pixel circuits 11 arranged two-dimensionally in a plane, a data driver 42, and a scanning driver 43. The data driver 42 transmits data signals to the respective pixel circuits 11 through data lines DL1-DLn. The scanning driver 43 transmits scanning signals through scanning lines SL1-SLn to perform the scanning for each pixel circuit row. As illustrated in FIG. 6, the data driver 42 includes a shift register, a data register, a data latch circuit, and a D/A converter. As illustrated in FIGS. 6 and 7, the threshold value correction circuit 31 is provided to each pixel circuit column, and a plurality of threshold value correction circuits 31 are arranged to constitute the threshold value correction circuit portion, which is disposed between the D/A converter and the pixel region 41. That is, the threshold value correction circuits 31 are arranged in the vicinity region of the pixel region 41, in which a plurality of pixel circuits 11 are arranged.

As illustrated in FIG. 3, each of the pixel circuits 11 includes an organic EL device 9, switches SW1-SW6, which are a first switch to a sixth switch, respectively, a drive transistor Tr10, and a capacitor 19. Each of the threshold value correction circuits 31 includes a current source (which is a current source circuit) 12, operational amplifiers AMP7 and AMP8, and resistor devices R14 and R15.

In the pixel circuit 11, the cathode of the organic EL device 9 is connected to the drain terminal of the N type drive transistor Tr10. The data voltage Vdata is input into the gate of the drive transistor Tr10, which is the control electrode thereof, through the fifth switch SW5. On the other hand, the output from the threshold value correction circuit 31 is accumulated in the capacitor 19 through the second switch SW2. In a period during which the organic EL device 9 emits a light, the signal from the threshold value correction circuit 31 is output to the gate of the drive transistor Tr10 by turning off the fifth switch SW5 and by turning on the fourth switch SW4.

The output terminal of the operational amplifier AMP7, which is a first operational amplifier, is connected to the inversion input terminal of the operational amplifier AMP8, which is a second operational amplifier, through the resistor device R14, which is a first resistor device. The non-inversion input terminal of the operational amplifier AMP7 is connected to the source terminal of the drive transistor Tr10 through the first switch SW1, and the inversion input terminal of the operational amplifier AMP7 is connected to its own output terminal. The output terminal of the operational amplifier AMP8 is connected to its own inversion input terminal through the resistor device R15. The capacitor 19 is connected to the output terminal of the operational amplifier AMP8 through the second switch SW2. The third switch SW3 is connected between the source terminal of the drive transistor Tr10 and the ground. One of the terminals of each of the fourth switch SW4 and the fifth switch SW5 is connected to the gate terminal of the drive transistor Tr10. The other terminal of the fourth switch SW4 is connected to the connection point of the capacitor 19 and the second switch SW2. The other terminal of the fifth switch SW5 is connected to the signal line from the data driver 42. The sixth switch SW6 is connected to both the terminals of the organic EL device 9 in parallel to the organic EL device 9.

The transistors and the capacitor 11 in the pixel circuit 11 are formed by an amorphous semiconductor process, and the current source 12, the resistor devices R14 and R15, and the operational amplifiers AMP7 and AMP8 in the threshold value correction circuit 31 are produced by a crystal Si process. The data driver section is similarly produced by the crystal Si process.

The circuit configuration of the present exemplary embodiment uses the first switch SW1 to the sixth switch SW6, and includes a circuit configuration to realize at least two modes of a "threshold value programming period" and a "light emitting device driving period" at the time of image display. The timing chart of each switch at that time is illustrated in FIG. 4.

In FIG. 4, P1 denotes the timing of the control signals of the first, second, and sixth switches SW1, SW2, and SW6; P2 denotes the timing of the control signal of the fifth switch SW5; P3 denotes the timing of the control signal of the third switch SW3; and P4 denotes the timing of the control signal of the fourth switch SW4.

Threshold Value Programming Period

Figure 8:
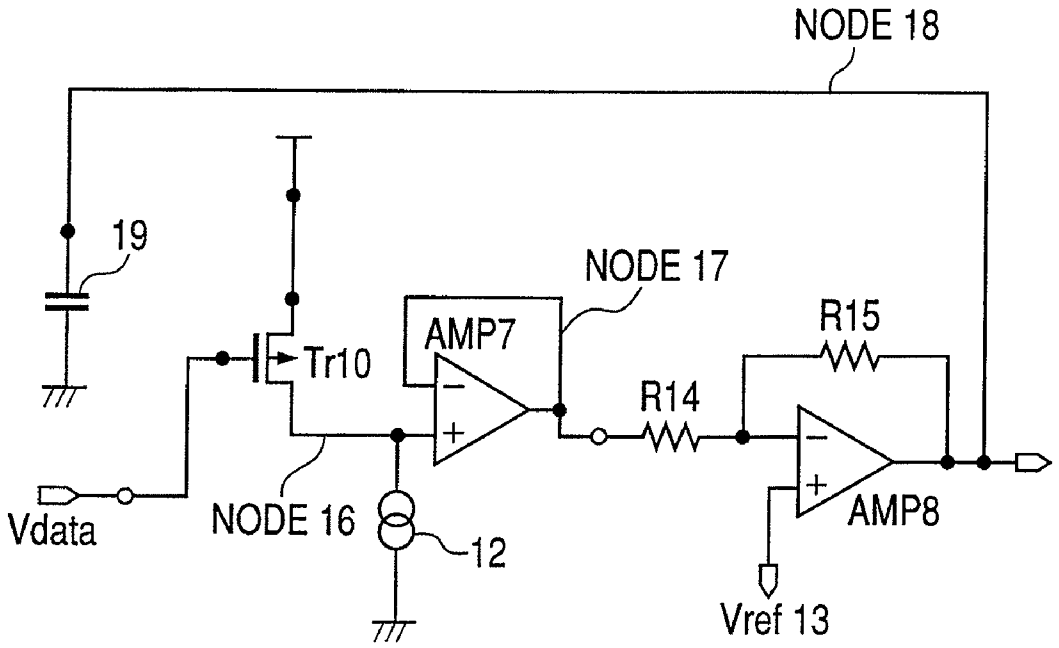
FIG. 8 is a diagram illustrating a circuit configuration of a pixel circuit portion and a threshold value correction circuit (also called compensation circuit) in a threshold value programming period.

FIG. 8 is a diagram illustrating the circuit configuration of the pixel circuit portion and the threshold value correction circuit 31 in the threshold value programming period.

As illustrated in FIG. 8, in the threshold value programming period, the first to the sixth switches SW1-SW6 are opened or closed so that there may be a period in which the first, second, fifth, and sixth switches SW1, SW2, SW5, and SW6 are simultaneously in their on-states and the third and fourth switches SW3 and SW4 are simultaneously in their off-states.

Light Emitting Device Driving Period

Figure 9:
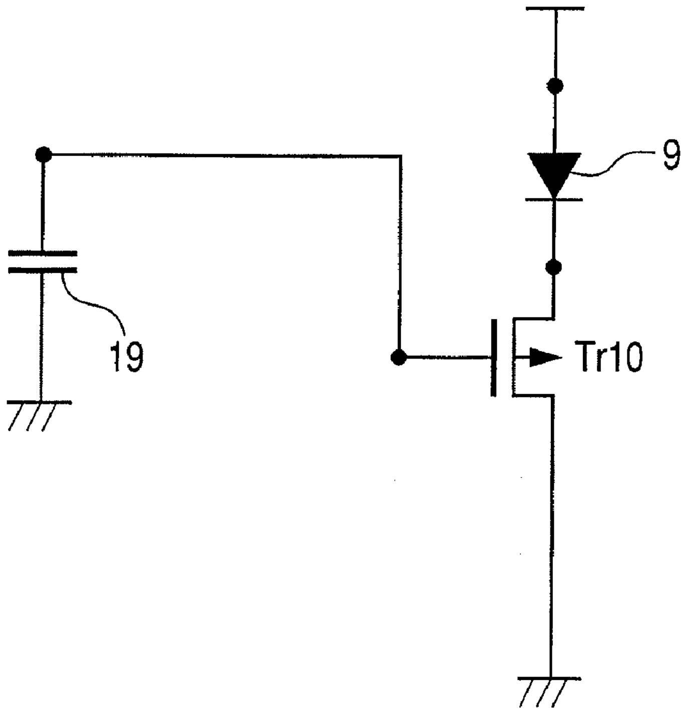
FIG. 9 is a diagram illustrating the circuit configuration in a region in which the connection with a light emitting device is performed.

FIG. 9 is a diagram illustrating the circuit configuration of the region in which the connection with the light emitting device in the light emitting device driving period is performed. As illustrated in FIG. 9, the switches SW1-SW6 are opened or closed so that there may be a period in which the third and fourth switches SW3 and SW4 are simultaneously in their on-states and the first, second, fifth, and sixth switches SW1, SW2, SW5, and SW6 are simultaneously in their off-states.

In the following, the operation of the circuit will be described.

In the threshold value programming period, as illustrated in FIG. 8, a signal Vdata from the D/A converter of the data driver 42 in FIG. 5 is input into the gate of the drive transistor Tr10 having the threshold value Vth and the reference power source Vref13 of the operational amplifier AMP8.

The drain of the drive transistor Tr10 at this time is connected to the power source, and the source thereof is connected to the current source 12. The drive transistor Tr10 and the current source 12 constitutes a source follower circuit, and the source voltage is input into the inversion input terminal of the operational amplifier AMP8, which is an inversion amplifier having the gain of one time, through the operational amplifier AMP7, which is a voltage follower. The resistor devices R14 and R15 are set to have the same resistance values.

If it is supposed that the output of the source follower is a node 16, and that the output of the voltage follower amplifier is a node 17 in FIG. 8 here, then, the electric potential of the node 16 is Vdata−Vth, and the electric potential of the node 17 is Vdata−Vth. In the operational amplifier (also called opamp) AMP8, if it is supposed that the input of the inversion input terminal thereof is the voltage Vin, then the output voltage Vout of the node 18 to the reference electric potential Vref13 is $$(V\text{in}+V\text{out})/2=V\text{ref}$$

$$V\text{out}=2V\text{ref}-V\text{in}.$$

If $V\text{in}=V\text{data}-Vth$ and $V\text{ref}=V\text{data}$, then $$V\text{out}=V\text{data}+Vth \quad (1)$$

This electric potential is held in the capacitor 19. Moreover, the organic EL device 9 does not emit any lights in this period.

Next, in the light emitting device driving period, as illustrated in FIG. 9, the gate terminal of the drive transistor Tr10 is isolated from the signal line from the data driver 42, and is connected to the capacitor 19 instead.

The drain terminal of the drive transistor Tr10 is connected to the cathode of the organic EL device, and the source terminal thereof is connected to the ground.

The drain current Ids of the drive transistor Tr10 can be expressed here as $$\text{Ids}\propto(\text{Vgs}-\text{Vth})^2$$

where Vgs denotes the gate-to-source voltage thereof.

Because Vgs=Vdata+Vth here owing to the operation in the previous threshold value programming period, the drain current Ids can be expressed as $$\text{Ids}\propto(\text{Vdata})^2 \quad (2).$$

Hereby, the current supplied from the drive transistor Tr10 to the organic EL device 9 takes a value independent of the threshold value Vth of the drive transistor Tr10, and is scarcely influenced by the value of the threshold value Vth and the changes of the value.

Incidentally, although the case in which the drive transistor Tr10 is that of the N type has been described in the aforesaid exemplary embodiment, the similar advantages can be expected even in the case of using the P type drive transistor.

Moreover, although the light emitting display apparatus using the organic EL devices has been described, the present invention can be also applied to a light emitting display apparatus that emits a light based on a supplied current and a current load device using a general current load expressing an arbitrary function base on a supplied current.

Second Exemplary Embodiment

The configuration of a second exemplary embodiment of the present invention is illustrated in FIGS. 3, 4, 8, and 9 almost similarly to that of the first exemplary embodiment. However, in the configuration of the second exemplary embodiment, the sixth switch SW6 illustrated in FIG. 3 is removed. One switching device in a pixel region can be hereby reduced in comparison with the configuration of the first exemplary embodiment.

In this case, in the threshold value programming period, the organic EL device 9 emits a light based on a supplied current having a parameter of the threshold voltage Vth of the drive transistor Tr10 as expressed by: $\text{Ids}\propto(\text{Vdata}-\text{Vth})^2$. However, because the threshold value programming period is a sufficiently short period as compared with the normal light emitting device driving period, the influences of the brightness in that period can be neglected when the influences are observed in the entire frame period.

Third Exemplary Embodiment

The configuration of a third exemplary embodiment of the present invention is illustrated in FIGS. 3, 4, 8, and 9 almost similarly to that of the first exemplary embodiment. However, in the configuration of the third exemplary embodiment, the current source 12 of the first exemplary embodiment is removed.

In this case, in the threshold value programming period, the node 16 takes substantially the electric potential level of (Vdata−Vth), and consequently, almost the same advantages can be obtained by the similar operation to that of the first exemplary embodiment.

Fourth Exemplary Embodiment

The configuration of a fourth exemplary embodiment of the present invention can be illustrated by FIGS. 3, 4, 8, and 9 similarly to that of the first exemplary embodiment. However, the reference power source 13 of the operational amplifier AMP8, which functions as an inversion amplifier, is not the signal from the data driver 42, but a DC power source having another electric potential level.

In this case, in the aforesaid threshold value programming period, the output of the operational amplifier AMP8 is $$(Vin+Vout)/2=Vref,$$

$$Vout=2Vref-Vin$$

where Vin=Vdata−Vth and Vref=V1 (V1 denotes an arbitrary DC voltage), and consequently is $$Vout=2V1-Vdata+Vth \quad (3).$$

On the other hand, the current flowing through the drive transistor Tr10 during the light emitting device driving period is $$Ids\propto(Vgs-Vth)^2,$$

$$Vgs=2V1-Vdata+Vth, \text{ and consequently is}$$

$$Ids\propto(2V1-Vdata)^2 \quad (4).$$

Then, the supplied current to the organic EL device 9 is scarcely influenced by the value of the threshold voltage Vth and the changes of the value similarly to that of the first exemplary embodiment.

Fifth Exemplary Embodiment

Figure 10:
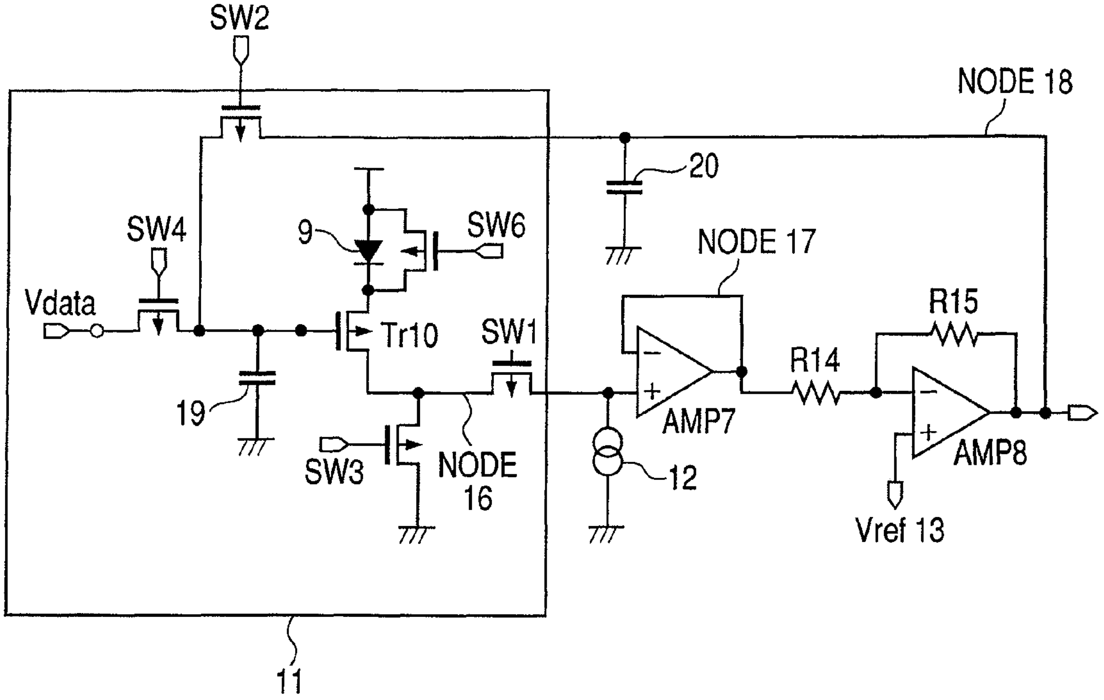
FIG. 10 is a diagram illustrating a fifth exemplary embodiment of a drive circuit of a light emitting display apparatus of the present invention.

A fifth exemplary embodiment of a drive circuit of the light emitting display apparatus of the present invention is illustrated in FIG. 10. The configuration of the fifth exemplary embodiment differs from that illustrated in FIG. 3 in that a capacitor 20 is provided and the switch SW5 are removed, and in that the data signal Vdata is input into the gate of the drive transistor Tr10, which is the control electrode thereof, through the fourth switch SW4. The capacitor 20 is shown here to generally express the parasitic capacitance components of the wiring from the data driver 42 to the second switch SW2 in the pixel and the switching transistors connected to the wiring.

Figure 11:
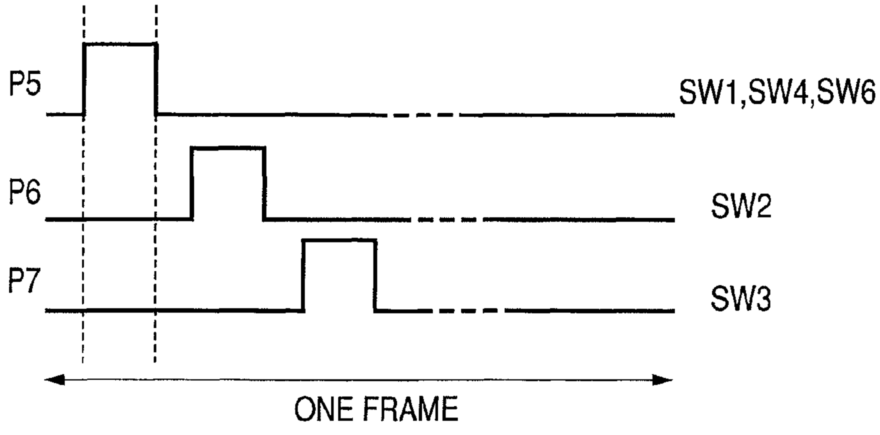
FIG. 11 is a diagram illustrating a time chart of the fifth exemplary embodiment.

The circuit configuration of the present exemplary embodiment includes a circuit configuration for realizing at least two modes of the "threshold value programming period" and the "light emitting device driving period" at the time of image display similarly to that of the first exemplary embodiment. The timing chart of each switch at that time is illustrated in FIG. 11.

Threshold Value Programming Period

Figure 12:
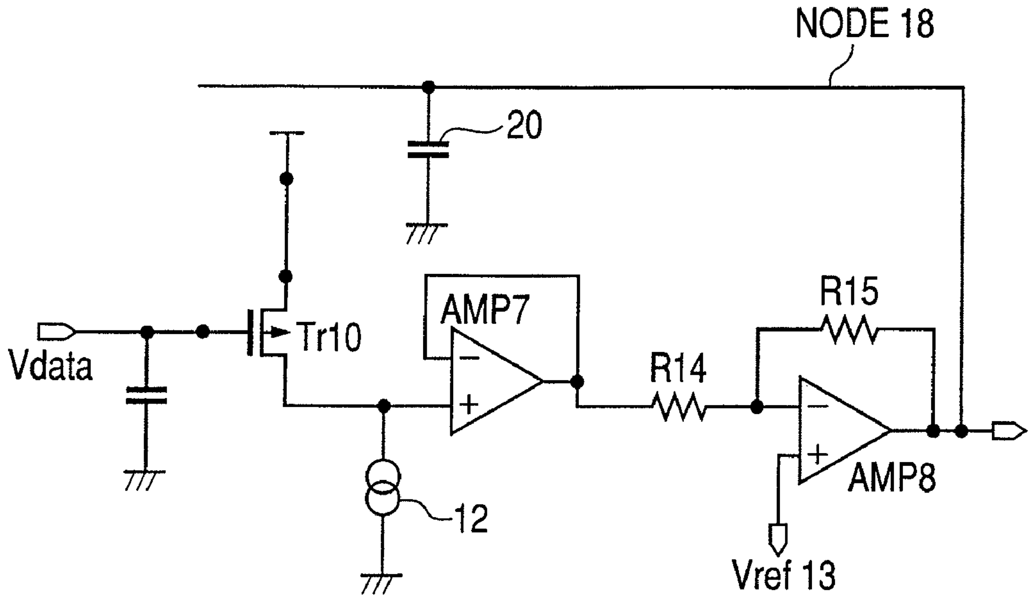
FIG. 12 is a diagram illustrating the circuit configuration of a pixel circuit portion and a threshold value correction circuit in a threshold value programming period.

FIG. 12 is a diagram illustrating the circuit configuration of the pixel circuit portion and the threshold value correction circuit 31 in the threshold value programming period. As illustrated in FIG. 12, the switches are opened or closed so that there may be a period in which the first, fourth, and sixth switches SW1, SW4, and SW6 are simultaneously in their on-states and the second and third switches SW2 and SW3 are simultaneously in their off-states.

Light Emitting Device Driving Period

Figure 13:
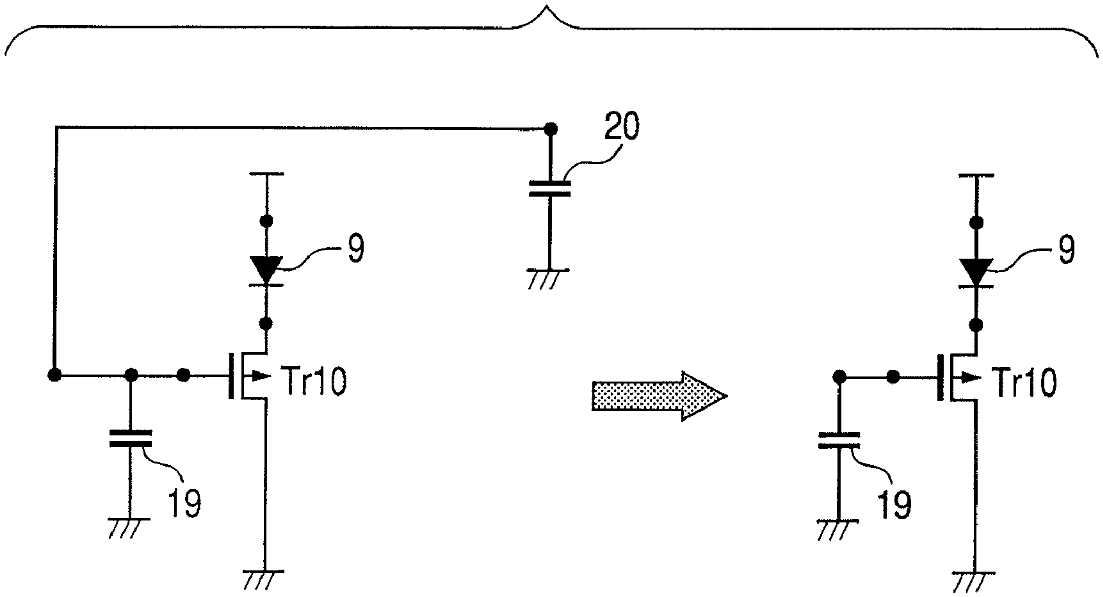
FIG. 13 is a diagram illustrating the circuit configuration of the pixel circuit portion and the threshold value correction circuit in a light emitting device driving period.

As illustrated in FIG. 13, the first, fourth, and sixth switches SW1, SW4, and SW6 are turned to be in their off-states, and the second switch SW2 is turned to be in its on-states. Thereby, the charges of the capacitor device 20 are moved to the capacitor 19. Next, the second switch SW2 is turned to be in its off-state, and the third switch SW3 is turned to be in its on-state. The capacitor 19 is connected to the gate terminal of the drive transistor Tr10; the organic light emitting device 9 is connected to the drain terminal of the drive transistor Tr10; and the source terminal of the drive transistor Tr10 is connected to the ground.

In the following, the operation of the circuit will be described.

In the threshold value programming period, the operation of the fifth exemplary embodiment is similar to that of the first exemplary embodiment. However, as illustrated in FIG. 12, the electric potential of the node 18 is accumulated in the capacitor 20. In this period, the organic EL device 9 does not emit any lights.

Next, in the light emitting device driving period, as illustrated in FIG. 13, the terminal of the capacitor 19 is first isolated from the signal line from the data driver 42, and is connected to the capacitor 20 instead, by turning the switch SW2 to be in its on-state and by turning the switch SW4 to be in its off-sate.

Next, the switch SW2 is turned to be in its off-state, and the charges of the capacitor 20 have moved to the capacitor 19.

The gate terminal of the drive transistor Tr10 is held by the capacitor 19 to be the voltage (Vdata+Vth). At the same time, the drain terminal of the drive transistor Tr10 is connected to the cathode of the organic EL device 9, and the source terminal thereof is connected to the ground.

The drain current Ids of the drive transistor Tr10 may be expressed here similarly in the first exemplary embodiment as $$Ids\propto(Vdata)^2 \quad (2).$$

Hereby, the current supplied from the drive transistor Tr10 to the organic EL device 9 takes a value independent of the threshold value Vth of the drive transistor Tr10, and is scarcely influenced by the changes of the value of the threshold voltage Vth.

In the present exemplary embodiment, the number of the switches in a pixel can be reduced by one as compared with six of the first exemplary embodiment.

Furthermore, if the sixth switch SW6 is also reduced similarly to the second exemplary embodiment, the present exemplary embodiment can operated with four switches in a pixel.

The AM type organic EL display apparatus of each of the aforesaid exemplary embodiments may configure an information display apparatus. The information display apparatus is used in a cellar phone, a portable computer, a camera such as a still camera and a video camera, and an apparatus realizing their plural functions.

In the following, as a desirable exemplary embodiment of the present invention, a digital camera using the AM type organic EL display apparatus described as the first exemplary embodiment is described.

Figure 14:
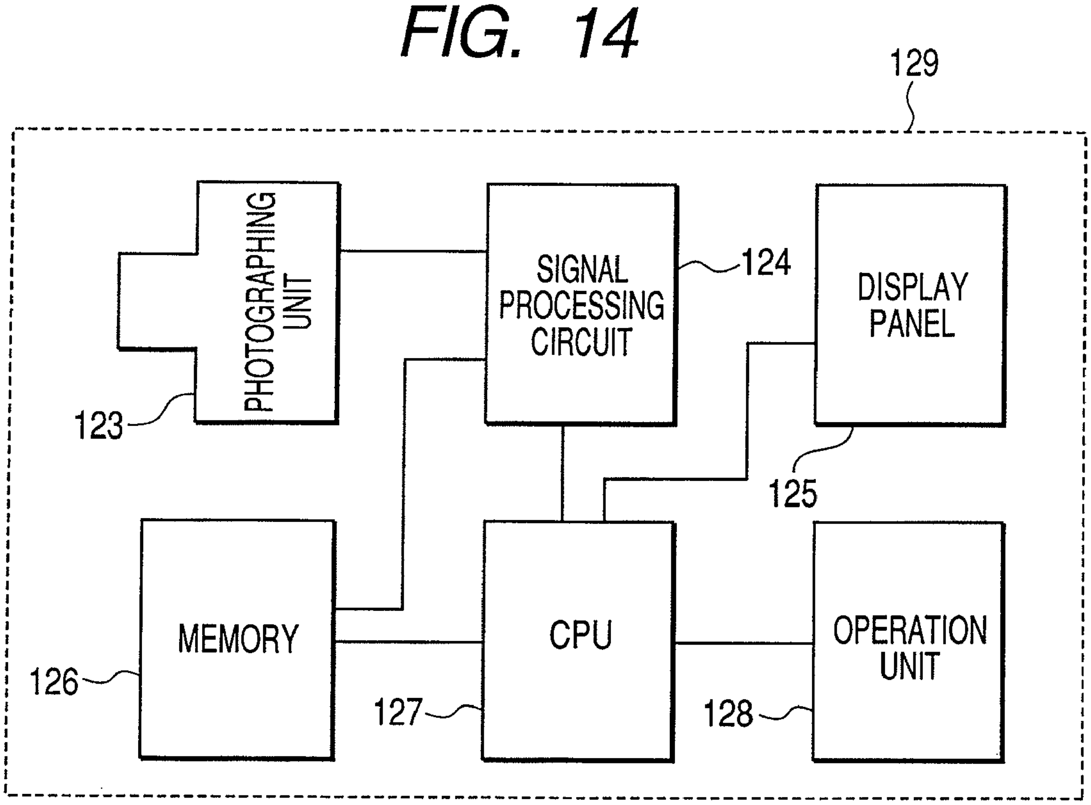
FIG. 14 is a block diagram of an example of a digital still camera.
Figure 15:
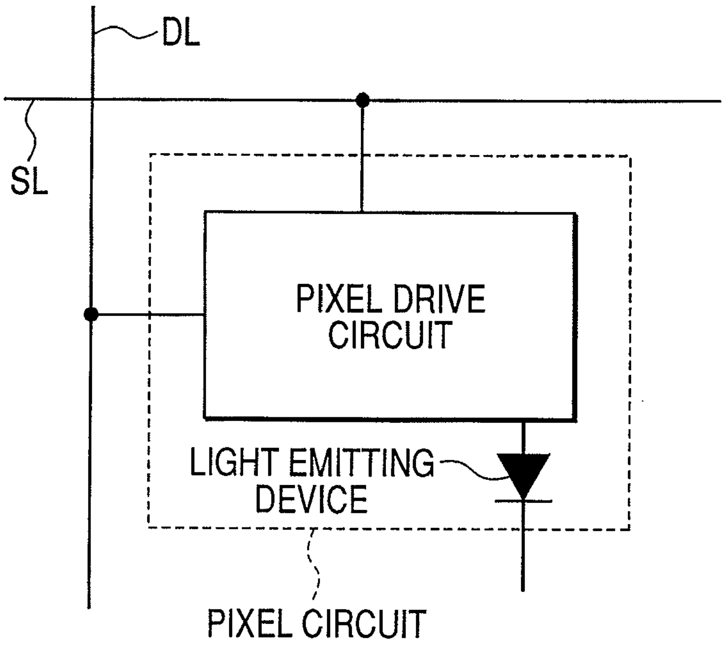
FIG. 15 is a diagram illustrating an arrangement of a pixel circuit in an active matrix type organic EL display apparatus.

FIG. 14 is a block diagram illustrating an example of a digital still camera. In the figure, the entire system 129 includes a photographing unit 123 for picking up an object image, an image signal processing circuit (which is an image signal processing unit) 124, a display panel 125, a memory 126, a CPU 127, and an operation unit 128. An image photographed by the photographing unit 123 or an image recorded in a memory 126 is subjected to the signal processing by the image signal processing circuit 124, and the image can be observed on the display panel 125. The CPU 127 controls the photographing unit 123, the memory 126, and the image signal processing circuit 124 based on an input from the operation unit 128 to perform photographing, recording, reproducing, and displaying suitable to a situation.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims priority from Japanese Patent Application No. 2007-061871 filed on Mar. 12, 2007, which is hereby incorporated by reference herein.

What is claimed is:

1. A drive circuit for a light emitting display apparatus including a pixel circuit having a light emitting device for emitting a light having brightness determined based on a supplied current, a drive transistor for supplying the current to the light emitting device, a first to a fifth switches, and a capacitor, and a threshold value correction circuit for correcting a threshold value of the drive transistor of the pixel circuit, wherein the threshold value correction circuit includes a first and a second operational amplifiers, and a first and a second resistor devices so that the first operational amplifier has an output terminal connected to an inversion input terminal of the second operational amplifier through the first resistor device, a non-inversion input terminal connected to a source terminal of the drive transistor through the first switch, and an inversion input terminal connected to the output terminal of the first operational amplifier, wherein the second operational amplifier has an output terminal connected to an inversion input terminal thereof through the second resistor device, wherein the capacitor is connected to the output terminal of the second operational amplifier through the second switch, wherein the third switch is connected between the source terminal of the drive transistor and the ground, and wherein one of terminals of each of the fourth switch and the fifth switch is connected to a gate terminal of the drive transistor, the other terminal of the fourth switch is connected to a connection point between the capacitor and the second switch, and the other terminal of the fifth switch is connected to a signal line from a data driver.

2. The drive circuit according to claim 1, wherein the pixel circuit is two-dimensionally arranged and the signal line is provided for every pixel circuit column; and wherein the threshold value correction circuit is provided for every pixel circuit column and is arranged in a vicinity region of a pixel region in which the plurality of pixel circuits are arranged.

3. The drive circuit according to claim 1, further comprising a current source circuit connected to a connection point between the first switch connected to the source terminal of the drive transistor and the non-inversion input terminal of the first operational amplifier.

4. The drive circuit according to claim 3, further comprising a sixth switch connected to both the terminals of the light emitting device in parallel to thereof.

* * * * *